US007424960B1

(12) United States Patent
Vokac

(10) Patent No.: US 7,424,960 B1
(45) Date of Patent: Sep. 16, 2008

(54) CHIP DISPENSER

(76) Inventor: Thomas J. Vokac, 24W 567 Ohio St., Naperville, IL (US) 60540

( * ) Notice: Subject to any disclaimer, the term of this patent is extended or adjusted under 35 U.S.C. 154(b) by 207 days.

(21) Appl. No.: 11/356,391

(22) Filed: Feb. 16, 2006

(51) Int. Cl.
*B65G 59/00* (2006.01)

(52) U.S. Cl. ......................... 221/121; 221/97; 221/132; 221/263

(58) Field of Classification Search ................. 221/132, 221/263, 97, 133
See application file for complete search history.

(56) References Cited

U.S. PATENT DOCUMENTS

| | | | | |
|---|---|---|---|---|
| 617,478 | A | 1/1899 | Cohen | |
| 783,477 | A | 2/1905 | Strauss | |
| 1,150,914 | A * | 8/1915 | Whitcomb | 453/44 |
| 1,719,826 | A * | 9/1929 | Aldrich | 221/131 |
| 2,013,901 | A * | 9/1935 | Shankland | 221/132 |
| 2,569,324 | A | 9/1951 | Moyer | |
| 2,653,850 | A | 9/1953 | Vollten | |
| 3,034,517 | A | 5/1962 | Reiland | |
| 3,359,993 | A | 12/1967 | Tryon | |
| 3,782,594 | A | 1/1974 | Langieri, Jr. | |
| 3,841,341 | A | 10/1974 | Englund | |
| 4,146,151 | A * | 3/1979 | Davis | 221/264 |
| 4,216,878 | A * | 8/1980 | Naud | 221/264 |
| 4,807,757 | A * | 2/1989 | Rappaport et al. | 221/132 |
| 4,830,375 | A * | 5/1989 | Fleming | 273/148 R |
| 4,928,970 | A * | 5/1990 | Latimer, Jr. | 273/148 R |
| 6,168,046 | B1 * | 1/2001 | Galesi | 221/251 |

* cited by examiner

*Primary Examiner*—Gene O. Crawford
*Assistant Examiner*—Timothy R Waggoner
(74) *Attorney, Agent, or Firm*—Robert L. Marsh

(57) ABSTRACT

A chip dispenser for dispensing a plurality of poker chips has a base with upper and lower surfaces and an outer wall through which extend a plurality of slides. Extending upward of the base is a plurality of tubular members for retaining chips. The thickness of each of the slides is chosen to be approximately equal to the number of chips to be dispensed with the actuation of each such slide. Upon actuation of a slide, the chips are moved to a cavity within the base and allowed to fall through a centralized hole in the bottom surface thereof and into a retainer.

18 Claims, 9 Drawing Sheets

CHIP DISPENSER

The present invention relates to a dispenser of chips of the type used to play poker or other games of chance, and in particular to an improved dispenser that will dispense a pre-selected number of chips on each actuation.

BACKGROUND OF THE INVENTION

It is common to provide a retainer for the chips used to play poker and to play other games of chance. Poker chips are disc shaped, with the most common sizes being approximately 40 millimeters, or one and nine-sixteenth inches in diameter and three millimeters, or one-eighth inch in thickness. Although the chips used in a single game are all equal in size, they may be different in color, with the differences in color and markings used to distinguish the value of the chips. Typically, the players determine the value of the chips before the commencement of play. The use of such chips being all of the same size and shape facilitates the play of a gambling game such as poker.

Chips are normally transported to and from a game site in a rectangular carrying case. At the game site, the chips are sold to players by a banker who is responsible for carrying out the money transactions. To aid in the distribution of chips, the banker may transfer the chips to a chip dispenser of the type know in the art.

The typical chip retainer has a generally cylindrical body with a plurality of longitudinal bores therein with the axes of the bores parallel to the axis of the body and with each bore having an elongate slot extending to the outer surface of the cylinder. The bore is open to one end of the cylinder and is closed at the other end with the open end directed upwardly and stacks of gambling chips, hereinafter referred to as "poker chips," inserted into each of the elongate bores. One can view the stack of the chips through the slot, and can count the desired number of chips to be removed at any one time and extend a finger through the slot to remove the chips desired. At the onset of and during a game of poker or other game of chance, the participants in the game purchase the number of chips they desire with the funds going to "the house." For serious poker players who enjoy an evening of fun playing games of skill and chance, one of the players serves as the house and assumes the task of buying and selling chips as needed by the players as the games proceed. The container that retains the chips from one night's festivities to the next also serves as the banker's vault for retaining chips prior to sale or returning purchased chips back to the house. The duties of the banker in buying and selling chips and maintaining control of the funds consumes a significant portion of the time of playing the game of poker. It is desirable, therefore, to have an efficient way of managing the chips of a poker game so that the time required of the banker as he sells or buys back chips is minimized.

It is also desirable to have a device that can easily dispense a predetermined number of chips to a player with the chips dispensed into an orderly stack, with like chips adjacent to each other so that they can be easily counted by the player who had made the purchase. It would also desirable to provide a device which would dispense such chips to a player in a stack that could be delivered to the player without requiring the banker to handle the individual chips.

SUMMARY OF THE INVENTION

Briefly, the present invention is embodied in a chip dispenser for dispensing a plurality of poker chips. The dispenser includes a dispensing structure that retains a plurality of stacks of chips with the stacks positioned around a vertical axis of the dispensing structure, and with the chips of each stack having a different denomination. The dispensing structure has a central opening in the bottom thereof. A plurality of slides is provided in addition to the dispensing structure, at least one slide for each stack of chips. Each slide is radially moveable with respect to the dispensing structure and radial movement of the slide causes one or more chips in the stack associated with the slide to be moved to the central opening where it will drop out of the dispenser.

The dispensing structure has a generally planar base having parallel horizontal upper and lower surfaces and an outer wall which may be in the form of a cylinder or a polygon. The base is mounted on a plurality of legs of equal length, and in the preferred embodiment each of the legs has a wheel mounted at the lower end thereof with the axes of all the wheels defining the radii of the same circle such that the wheels facilitate rotation of the dispenser about a horizontal longitudinal axis of the generally cylindrical base. Extending upward from the base are a plurality of transparent tubes each of which has an inner diameter suitable for receiving a stack of poker chips, with the longitudinal axes of the tubes being parallel to one another and spaced in a circle around a central horizontal longitudinal axis of the dispenser. At the upper end of the tubes is a sealable cover to prevent the poker chips in the various tubes from escaping in the event the dispenser becomes tilted on its side.

The base has a inner cavity that is accessible through a central opening in the bottom surface thereof with the central opening sized to permit the easy release of one or more poker chips. The outer wall of the base has a plurality of spaced apertures therein with each of the apertures opening into a passageway that extends into the inner cavity. Each of the apertures has a width that is at least as wide as the diameter of the poker chip to be dispensed and has a height equal to the maximum number of chips to be dispensed upon any actuation of the dispenser. If, for example, the device is to dispense a maximum of five chips on each actuation, the apertures have a height at least equal to the thickness of a stack of five poker chips but less than the height of a stack of six chips.

The upper surface of the base also has a plurality of apertures therein, with each of the apertures in the upper surface receiving one of the tubular retainers for retaining a stack of poker chips and each of the apertures in the upper surface open into one of the passages extending from the outer wall to the inner cavity. Fitted into each of the apertures in the outer wall is a slide that is radially moveable from an outward position to an inward position. Each of the slides has a vertical surface at the inner end thereof and a planar surface extending from the inner end to the outer end thereof. When the slide is in the outward position, the vertical surface engages one or more chips in the stack of chips extending into the associated passage from the retainer above. When the slide is moved radially inwardly to the inward position, the chip or chips engaged by the vertical surface are urged through the passage to a position over the central opening in the lower surface of the base. As the slide moves one or more chips out from beneath the stack of chips, the planar upper surface of the slide retains the stack of chips in substantially the same elevation they were prior to the movement of the slide. With the slide in the inner position and the chips over the central opening, the chips will fall through the central opening to a collection point below. When the slide is subsequently withdrawn to the outward position, the stack of chips will remain at their same elevation until the planar horizontal surface of the slide moves out from beneath the chips after which the stack will drop down to a lower surface of the passage. One or more new chips are then positioned before the vertical surface of the slide.

The chips dispensed through the central opening in the dispensing structure may be captured in the hand of a banker positioned below the central opening or received in a collection cup having inner dimensions sufficiently large for the cup to receive a stack of chips.

Another aspect of the invention is that all the passages have a predetermined given height. Also, the dispenser is preferably provided with more slides than there are dispensing passages into which the slides are received. At least one of the slides has a thickness that is a little less than the height of the passage, such that the vertical surface of the slide extends across the maximum number of chips that can fall within the passage, thereby permitting the dispensing of the maximum number of chips with any movement of the slide. At least one slide has a thickness that is somewhat less that the height of the passages, the height being approximately equal to the thickness of one or more chips but less than the maximum number of chips that are dispensed by the first slide. This second slide has an associated spacer for insertion into the passage for reducing the height thereof to less that its original height. The height of the passage is reduced by the spacer to the height of a stack of poker chips that is less than the number engaged by the first slide. The spacer therefore reduces the height of the passage to thereby reduce the number of chips in the stack of chips that are engagable by the vertical surface of a slide. When the second slide is then moved from the outward position to the inward position the vertical surface of the second spacer will urge one or more poker chips into the central opening of the cavity where the number of chips is less than the number of chips dispensable by the first slide.

BRIEF DESCRIPTION OF THE DRAWINGS

A better understanding of the invention will be had after a reading of the following detailed description taken in conjunction with the drawings wherein.

DETAILED DESCRIPTION OF THE INVENTION

Figure 1:
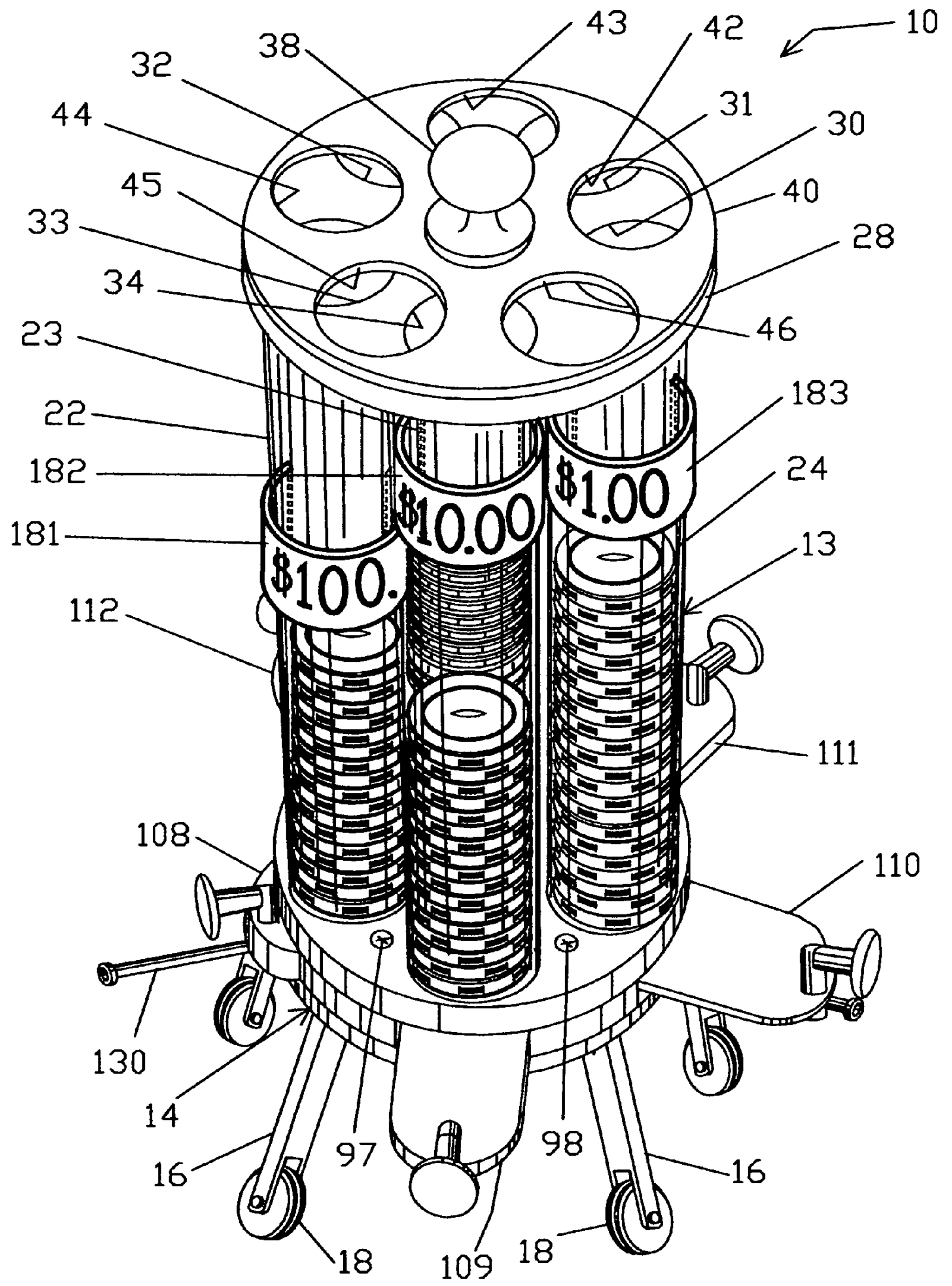
FIG. 1 is an isometric view of a dispensing device in accordance with the present invention.
Figure 2:
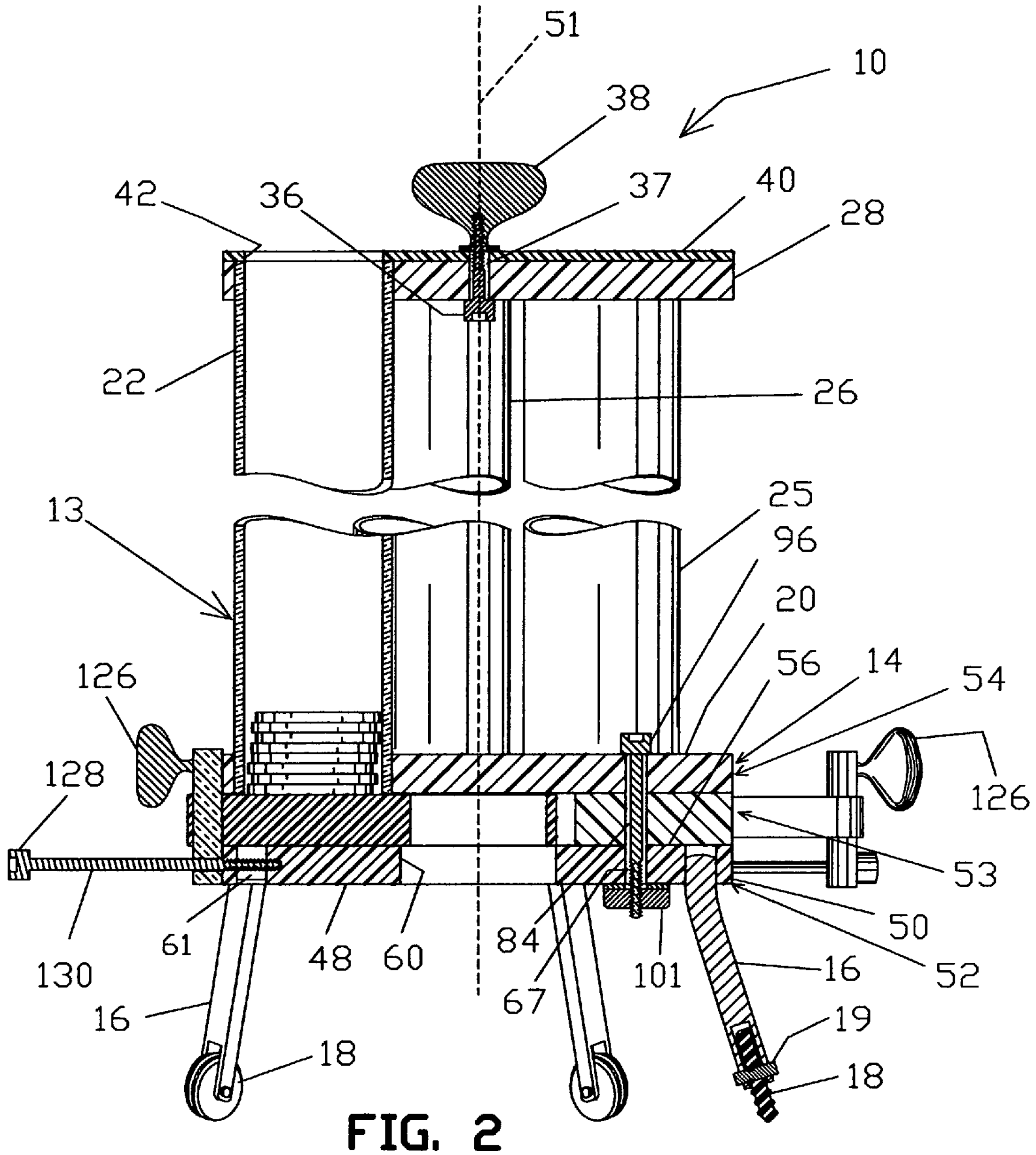
FIG. 2 is a cross-sectional view of the dispensing device shown in FIG. 1.
Figure 18:
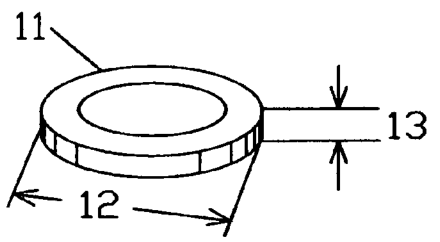
FIG. 18 is an isometric view of a chip for use with the dispenser shown in FIG. 1.

Referring to FIGS. 1, 2, and 18, a chip dispenser 10 in accordance with the present invention is used to dispense a plurality of disc shaped poker chips 11. Each poker chip 11 has a generally cylindrical shape with a diameter 12 and a height 13. The diameter 12 of a typical chip is approximately 40 millimeters or one and nine-sixteenths inches and the height 13 is approximately three millimeters or one-eighth inch. It should be appreciated that the sizes of poker chips are not standardized by law and therefore there are variations in size depending on the manufacturer of the chip. Nonetheless, most poker chips have dimensions approximately equal to the forgoing sizes.

The dispenser 10 consists of a dispensing structure 13 and a plurality of removable slides 108-112. The dispensing structure 13 has a generally horizontally oriented base member 14 that contains the apparatus for dispensing the poker chips 11. The base 14 may be cylindrical or may have a shape, as view from above, of a polygon such as a square, a pentagon, or a hexagon, but it is depicted herein as a cylinder. The base 14 is mounted on a plurality of legs 16-16, each of which has a wheel 18-18 at the lower end thereof. The wheels 18-18 are mounted on axes 19 as best shown in FIG. 2, where all the axes are radii of the same circle with the center of the circle is positioned at the horizontal axis of the chip dispenser 10. This permits the dispenser to be easily rotated about its vertical axis to thereby enable a banker to easily fill an order for chips.

Extending upward from the upper surface 20 of the base 14 are a plurality of transparent cylindrical tubes 22, 23, 24, 25, 26 all of which have the same inner and outer diameters with the inner diameter sized to slideably receive a stack of chips 11-11 therein. Secured to the upper ends of the tubes 22-26 is a generally cylindrical upper plate 28 with apertures 30, 31, 32, 33, 34 therein each of which is sized and shaped to receive the upper end of one of the tubes 22-26 to thereby retain the assembly of the base 14, the tubes 22-26, and upper plate 28 in a rigid relationship. The shank of a bolt 36 extends upwardly through a centrally located transverse hole 37 in the upper plate 28 and is threaded into a threaded hole in the bottom of an enlarged handle 38 to enable a user to easily carry and transfer the chip dispenser 10. A cover plate 40 is fitted above the upper plate 28 and has a plurality of holes 42, 43, 44, 45, 46 therein that are spaced around the circumference of the cover plate 40 and have an outer diameter sufficiently large to permit a chip to fall through. The cover plate 40 also has a central hole, visible in FIG. 2 but unnumbered, that is larger than the diameter of the shank of the bolt 36 but smaller than the size of the handle 38 such that the cover plate 40 is rotatably fit around the shank of the bolt 36 and above the upper plate 28. The holes 42-46 in the cover plate 40 are positioned in the cover plate 40 complementary to the apertures 30-34 in the upper plate 28. Accordingly, when the holes 42-46 of the cover plate 40 are aligned with the holes 30-34 of the upper plate 28, as shown in FIG. 2, a user can insert additional chips through the aligned holes 30-34, 42-46 and into the various tubes 22-26, and when the cover plate 40 is rotated so that the various holes are not in alignment, as shown in FIG. 1, cover plate 40 will retain the various chips within the tubes 22-26.

The base 14 has a generally planar upper surface 20, a generally planar lower surface 48 and an outer wall 50 which extends between the upper and lower surfaces. The outer wall 50 may be cylindrical as depicted or may be a polygon such as previously stated. It is preferable that if the walls 50 of the base have a polygon shape that the shape be equilateral, that is all the sides be of equal length and the angles be equal to each other such that the upper surface 20 and lower surface 48 have definable centers, with the tubes 22-26 spaced around the outer circumference of the base 14. The dispensing structure 13 therefore has a definable vertical axis 51 that extends through the center of the base 14 and up through the axis of bolt 36 at the top of the device.

The base 14 consists of three generally planar layers including an upper member 54, a central layer 53, and a lower member 52 stacked one above the other with their outer walls aligned with each other to form a continuous outer wall 50. Each of the members 52, 54 and layer 53 is made of a suitable material such as wood or plastic which has sufficient rigidity to retain its shape and withstand the abuses that are inevitable when the dispenser 10 is used over a lengthy period of time by poker players. It is also desirable that the material of which the base 14 is made not be unduly heavy or difficult to manufacture and therefore wood or plastic is the preferred material.

Figure 3:
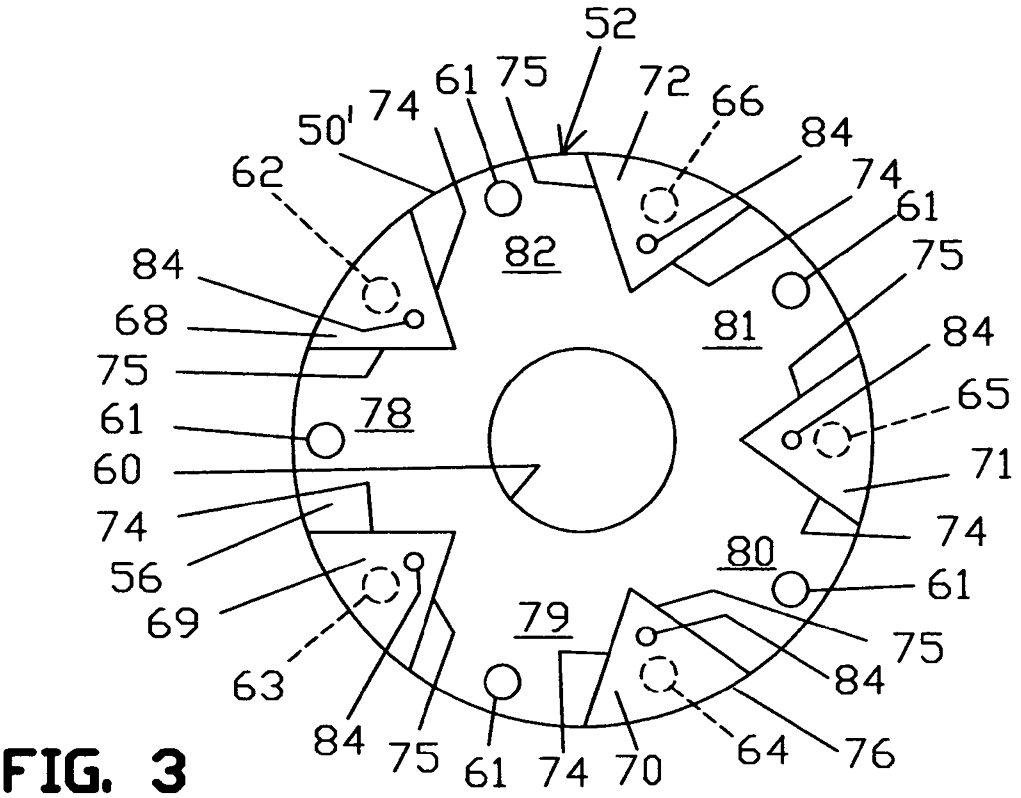
FIG. 3 is a top view of the lower member of the base of the dispensing device with wedges spaced around the lower member to form a plurality of radial channels.
Figure 4:
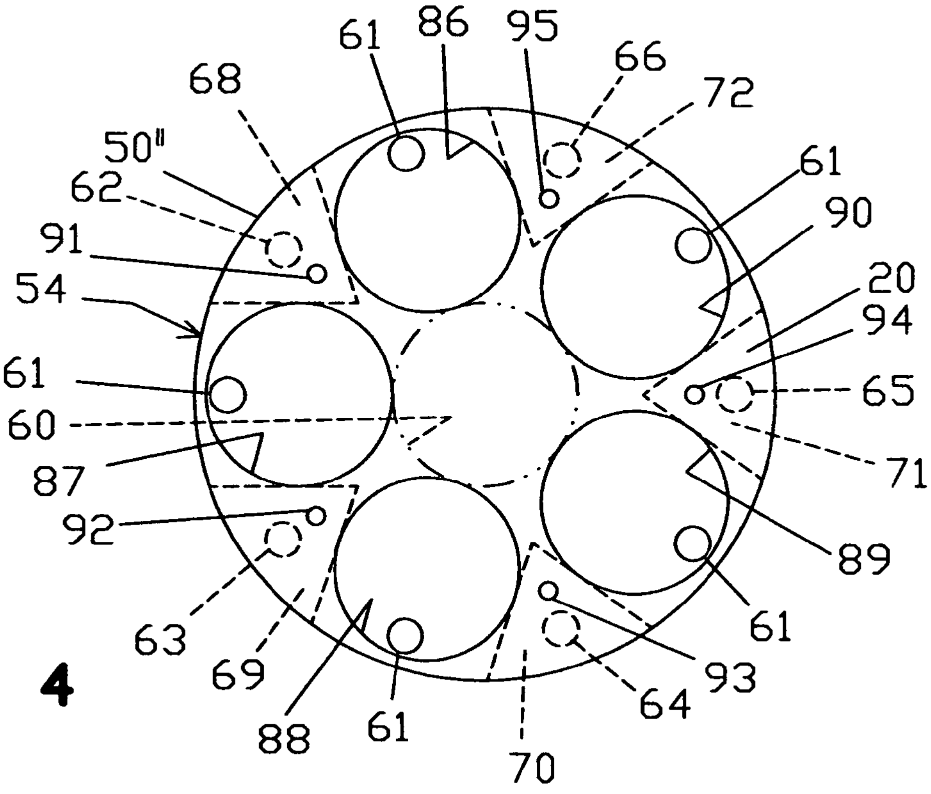
FIG. 4 is a top view of the base of the dispensing device with the inner positions of the base shown in broken lines.

Referring to FIGS. 2 and 3, the lower member 52 has an upper surface 56, an outer wall 50' which when assembled to layer 53 and member 54 forms a portion of the outer wall 50, and a lower surface 48 that forms the lower surface of the base 14. Centrally located in the lower member 52 is a transverse hole 60 sized to permit a poker chip 11 to pass therethrough. Extending into the lower surface 48 and spaced near the outer edge thereof, are a plurality of blind holes 62, 63, 64, 65, 66, shown in broken lines, into which the upper ends of the legs 16-16 are inserted and secured by any appropriate means such as a glue. The lower member 52 also has a plurality of holes equally spaced around the circumference thereof, one of which 67 is visible in FIG. 2. The spaced holes 67 are positioned near outer surface 50' and align with holes in layer 53 and member 54 so as to receive retaining bolts 96 for retaining the base 14 in assembled relationship as is further described below. Another plurality of spaced blind holes 61-64 extend into the upper surface 56 and are positioned near the outer surface 50' for receiving a retaining pin to retain a spacer as will also be further described below.

Referring further to FIG. 3, the central layer 53 of the base 14 is not a unitary part, but is made up of a plurality of pie shaped wedges 68, 69, 70, 71, 72 with each of the wedges having a pair of converging walls 74, 75 and an arcuate outer end 76. The wedges 68-72 are positioned above the lower plate 52 with the arcuate outer end 76 of each pie shaped wedge defining an arc that forms a portion of the cylindrical outer wall 50 of the base 14. The side walls 74, 75 of each of the wedges 68-72 are equally spaced from the walls 74, 75 of the adjacent wedges so as to form a plurality of channels 78, 79, 80, 81, 82 with each channel 78-82 extending radially from the outer surface 50 of the base 14 into a central opening immediately above the transverse hole 60 in the lower plate 52. The walls 74, 75 of the wedges are not radii of a cylinder defined by the outer wall 50, but are angled to provide parallel walls 74, 75 for each channel 78-82.

Figure 7:
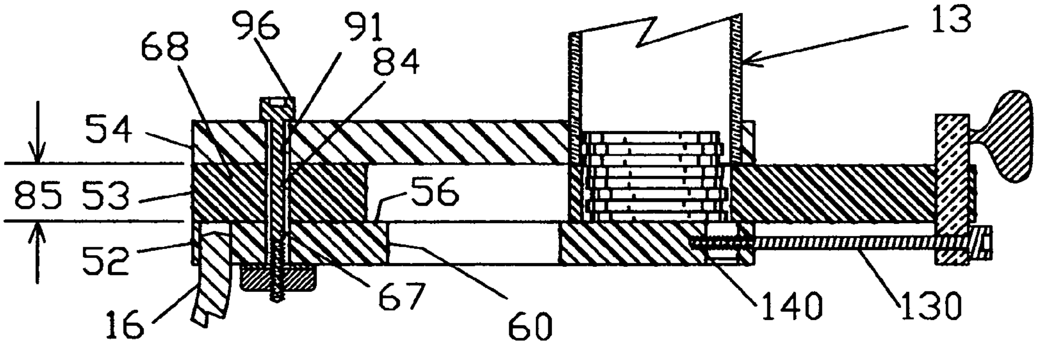
FIG. 7 is a fragmentary cross-sectional view of the dispensing device showing the slide shown in FIGS. 5 and 6 in the outward position and ready to dispense chips.
Figure 8:
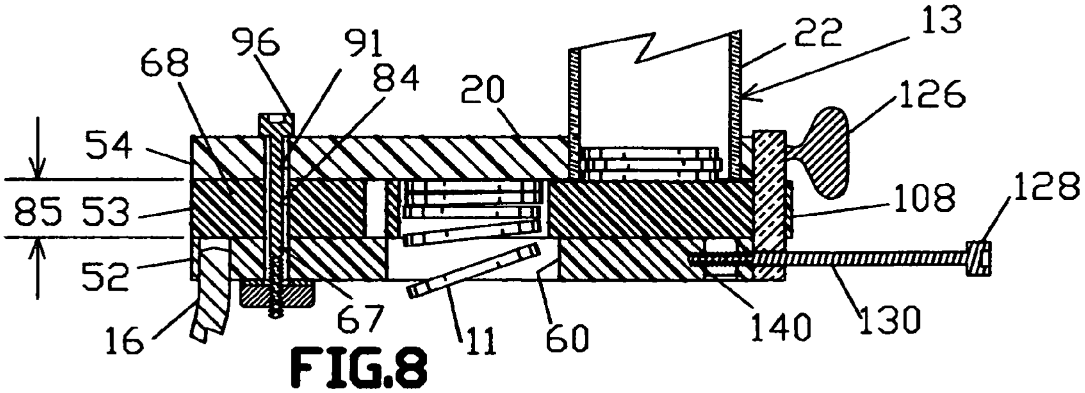
FIG. 8 is another cross-sectional view of the dispensing device with the slide shown in FIGS. 5 and 6 with the slide moved inward to dispense chips.
Figure 9:
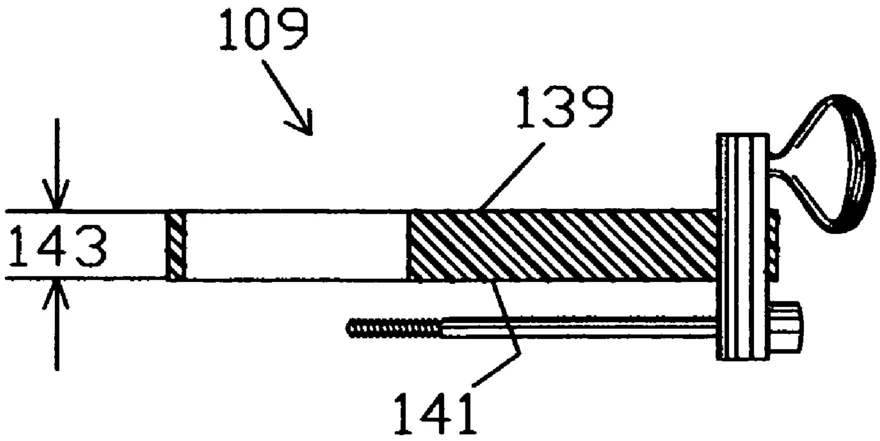
FIG. 9 is a cross-sectional view of another slide for use with the dispensing device shown in FIG. 1.
Figure 10:
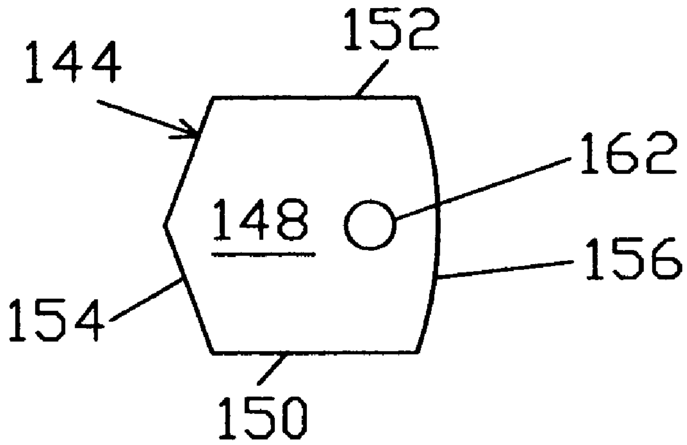
FIG. 10 is a bottom view of a spacer for use with the slide shown in FIG. 9 in the dispenser shown in FIG. 1.
Figure 11:
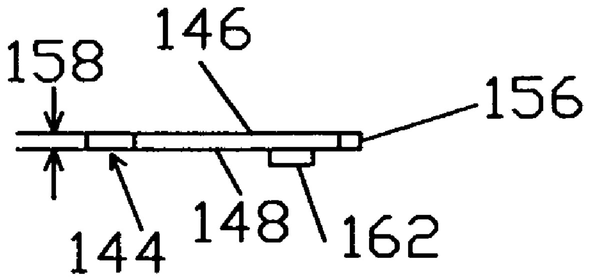
FIG. 11 is a side view of the spacer shown in FIG. 10.

Referring to FIGS. 3, 7 and 8, each of the wedges 68-72, wedge 68 being depicted in FIGS. 7 and 8, also has a centrally located transverse hole 84 therein extending from the upper surface to the lower surface. Hole 84 of each wedge aligns with one of the holes 67 in the lower member 52 for receiving a bolt 96 for retaining the base 14 in assembled form as further described with respect to the upper member 54.

The wedges 68-72 are also made of a material, such as wood or plastic and have a thickness 85 that is a little greater than the thickness of a stack of the maximum number of chips 11-11 that the dispenser 10 is to dispense at each dispensing operation. Preferably, the dispenser 10 be capable of dispensing a maximum of five chips on each dispensing operation and therefore the thickness 85 of the wedges should be about sixteen millimeters or eleven sixteenths of an inch. Each of the passages 78-82 therefore has a height equal to the thickness 85 of the wedges 68-72. Each of the passages 78-82 has a width, as defined by the distance between the walls 74, 75 thereof that is a little greater than the diameter 12 of a chip 11.

Referring to FIGS. 2, 3, 4, 7, and 8, the upper member 54 has an upper surface 20 which is the upper surface of the base member 14, a planar lower surface, not numbered, and a cylindrical outer wall 50" that has a diameter equal to that of the outer wall 50' of the lower plate such that the outer surfaces of the stacked members 52, 54 and layer 53 form the cylindrical outer wall 50 of the base 14. The upper plate 54 also has a plurality of apertures 86, 87, 88, 89, 90 therein with the apertures symmetrically spaced a short distance from the outer circumference of the cylindrical outer wall 50". Each of the apertures 86-90 has a diameter sized to slideably retain one of the tubes 22-26 and the lower ends of each of the tubes 22-26 is retained by a suitable glue or the like into one of the apertures 86-90. The lower surface of the upper plate 54 is positioned immediately above the upper surfaces of the wedges 68-72 while the wedges 68-72 are assembled in a spaced relationship around the outer edge of the lower plate 52. Spaced around the circumference of the upper member 54 are a plurality of transverse holes 91, 92, 93, 94, 95 aligned with one of the holes 84 in each of the wedges 68-72 and with the holes 67 of the lower member 52. The upper and lower members 52, 54, and the wedges 68-72 are all retained together to form a unified base 14 by a plurality of bolts, one for each of the aligned sets of holes 91-95. One of the bolts 96 is shown in cross-section in FIGS. 2, 7, and 8 and the heads of two others 97, 98 are shown in FIG. 1. Each of the bolts 96-100 is held in place by an associated nut one of which, 101, is visible in FIGS. 2, 7, and 8.

When the upper member 54 is assembled to the lower member 52 and these members are spaced apart by the equally spaced layer of wedges 68-72, the channels 78-82 become passages between the spaced apart walls 74, 75 of any two of the wedges 68-72, the passages opening in the outer wall 50 of the base 14 and extending into a cavity between the upper and lower plates 52, 54 at the inward ends of the wedges 68-72.

Figure 5:
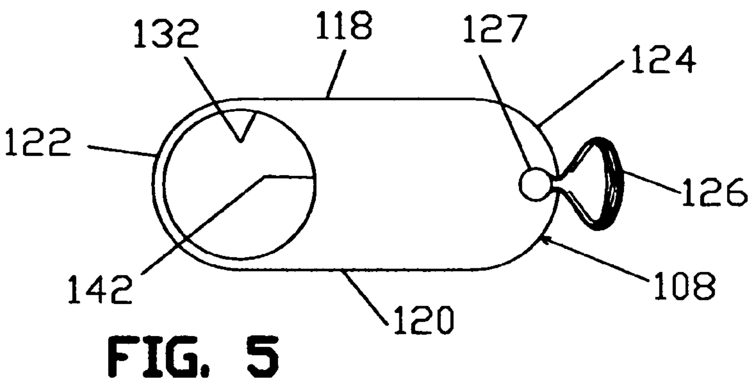
FIG. 5 is a top view of one of the slides for use with the dispensing device shown in FIG. 1.
Figure 6:
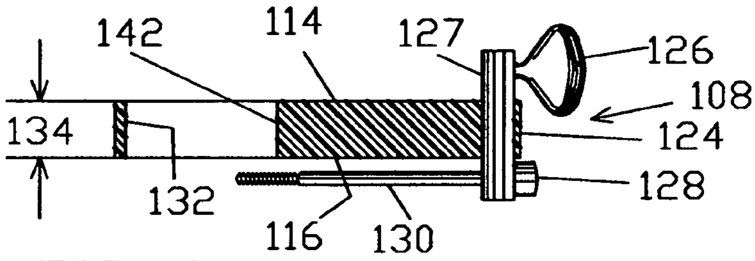
FIG. 6 is a cross-sectional view of the slide shown in FIG. 5.

Referring to FIGS. 1, 5, and 6, received within each of the passages 78-82 is a slide 108, 109, 110, 111, 112. Each slide 108-112 is like any other slide 108-112 except for the thickness thereof, which may be or may not be different from slide to slide as needed or desired to provide for the dispensing of different numbers of chips 11 as is further described below. Since the slides 108-112 are identical to each other except for thickness, slide 108 is therefore representative of all, and it and its operation are depicted in FIGS. 7 and 8 as being representative of all. Each slide 108 is made of a suitable material such as wood or plastic and has generally planar upper and lower surfaces 114, 116, opposing spaced apart side walls 118, 120, an inner end 122, and an outer end 124. The side walls 118, 120 are spaced apart a distance that is a little less than the distance between adjacent walls 74, 75 of wedge segments 68-72 that form the sides of the passages 78-82. Similarly, the thickness 134 of the slide 108, as determined by spacing between the upper and lower surfaces 114, 116 is a little less than the thickness 85 of the wedges 68-72 such that the body of slide 108 will be slideably received within any one of the channels 78-82. A handle 126 is mounted on a downwardly extending post 127 that extends through a hole, unnumbered but visible in FIG. 6, in the outer end 124 of the slide 108, and the lower end of the post 127 projects through the slide 108 and has a transverse hole therein, not visible, for receiving a retaining pin 130 having an enlarged head 128 to prevent the spurious removal of the slide 108 from its associated passage 78. The handle 126 can be grasped by a banker for moving the slide 108 inwardly and outwardly of the associated passage 78-82. The inward end 122 of the slide 108 is arcuate in shape with a transverse cylindrical aperture 132 therein. The diameter of the aperture 132 is a little larger than the outer diameter 12 of a chip 11 such that a portion of the stack of chips 11-11 in the cylinder 22 can extend through the aperture 132.

Referring to FIGS. 7 and 8, the slide 108 is moveable within passage 78 from an outward position, shown in FIG. 7, to an inward position shown in FIG. 8. When in the outward position, the aperture 132 is aligned immediately below the cylindrical inner opening of one of the tubes 22. When a stack of chips 11-11 is inserted into the tube 22, the bottom chip will rest upon the upper surface 56 of the lower plate 52 and the bottom chip, plus the next four chips 11 above it, will be surrounded by the walls of the aperture 132 of the slide 108. When the slide 108 is subsequently moved to the inward position, as shown in FIG. 8, the portion of the stack of chips 11-11 that is circled by the wall of the aperture 132 at the inner end 122 of the slide 108 is moved axially inwardly until the aperture 132 is positioned immediately over the hole 60 in the lower plate 52, thereby moving the lower five chips from below the tube 22 to a position over the hole 60. The chips 11-11 in the portion of the stack moved over the hole 60 will then drop through the hole 60 and into a suitable container as is further described below.

Referring further to FIGS. 1, 2, and 7, the retaining pin 130 extends parallel to the length of the slide 108 and the threaded end of the retraining pin 130 is threaded into a threaded hole 140 in the outer wall 50 of the lower plate 52 immediately below the associated passage 78. When threaded into the hole 140 the length of the shank of the pin 130 between the outer wall 50 of the base 14 and the head 128 of the pin is sufficient to allow the slide 108 to move from the outer position, depicted in FIG. 7, to the inner position, depicted in FIG. 8. The head 128 of the retaining pin 130 is larger than that of the hole in the post 130 through which the pin 130 extends and therefore prevents the spurious removal of the slide 108 out of its associated passage 78.

Referring to FIGS. 5 through 8, it should be appreciated that although the inner end 122 of the slide 108 is depicted as having an aperture 132 therein that surrounds the lower end of the stack of chips, it is the purpose of the slide 108 to urge the chips 11-11 in the lower portion of the stack from a position below its associated tube 22 to a position over the central hole 60. This is undertaken by a vertical surface 142 of the slide 108 that is adjacent the lower chips in the stack in the tube 22. Accordingly, the inner end of the slide may have any of a number of configurations as long as it provides for a vertical surface 142 for urging the chips 11 in the lower portion of the stack to the central hole 60.

Referring to FIGS. 1, 3, 9, 10, and 11, a second slide 109 is very similar to the first slide 108 and includes upper and lower surfaces, unnumbered, that are substantially identical to the upper and lower surfaces 114, 116 of slide 108. The slide 109 is also provided with a handle, a downward projecting post, and a retaining pin to prevent the spurious removal of the slide 109 from its associated passage 79 all unnumbered but as described with respect to slide 108. Slide 109 differs from slide 108 in that the distance between the upper and lower surfaces 139, 141 thereof define a thickness 143 that is less than the thickness 134 of slide 108. The thickness 143 of slide 109 is a little less than the thickness of a stack of four chips 11, that is, one fewer in number than the stack of five chips engaged by slide 108. To compensate for the thinner slide 108, a spacer 144 is provided having upper and lower surfaces 146, 148 and generally parallel side walls 150, 152, and inner and outer ends 154, 156. The side walls 150, 152 are spaced apart a distance a little less than the distance between adjacent walls 74, 75 of the wedge segments 68-72. Preferably, the side walls 150, 152 are spaced apart a distance that is equal to the distance between side walls 118, 120 of the slide 108. The outer end 156 has an arcuate configuration so as to form a portion of the cylindrical outer wall 50 of the base members 14, and the inner end 154 may have any configuration so as not to interfere with the movement of any other slide and not interfere with the falling of chips 11 through the hole 60 in the lower plate 52. The spacer 144 has a thickness 158 that is approximately equal to the thickness of a single chip 44, that is 3.400 millimeters, or about 0.134 inches. The spacer 144 also has a prong 162 extending from its lower surface that fits into one of the blind apertures 61 in the upper surface 56 of the lower plate 52 to retain the spacer 144 within the passage 79 so as not to be dislodged by the inward and outward movement of the slide 109.

When the spacer 144 is positioned on the upper surface 56 of the lower plate 52 between the walls 74, 75 of any two wedges 68-72 the height of the passage 79 will be reduced by the thickness 158 of the spacer 144. The remaining unobstructed portion of the passage 79 will not longer have a height sufficient to retain the slide 108 but will accept the slide 109 with the reduced thickness 143.

Figure 12:
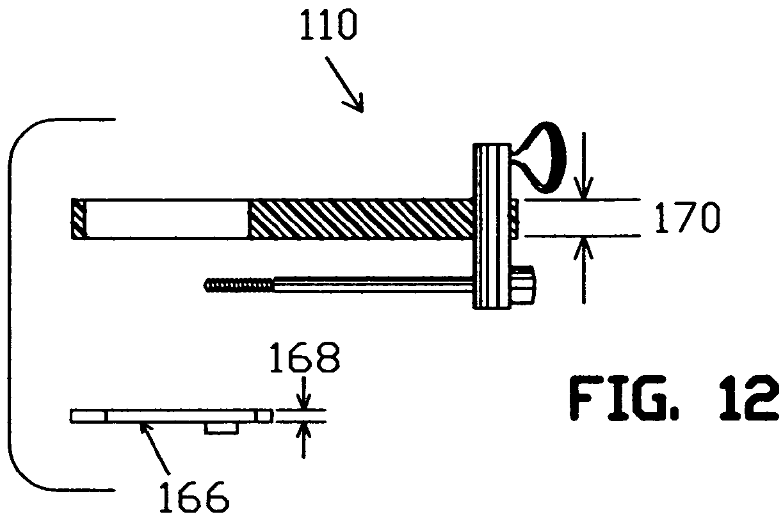
FIG. 12 is a cross-sectional view of a third slide and a side view of a spacer for use with the third slide.

Referring to FIG. 12, in similar fashion the third slide 110 is provided with a second spacer 166 where the second spacer has a thickness 168 that is equal to the height of a stack of two chips 11. The third slide 110 is identical to the first slide 108 except that the thickness 170 thereof is reduced by the thickness 168 of the second spacer 166 such that when passage 80 is fitted with the spacer 166 and the third slide 110, it is suited to eject three chips rather than five.

Figure 13:
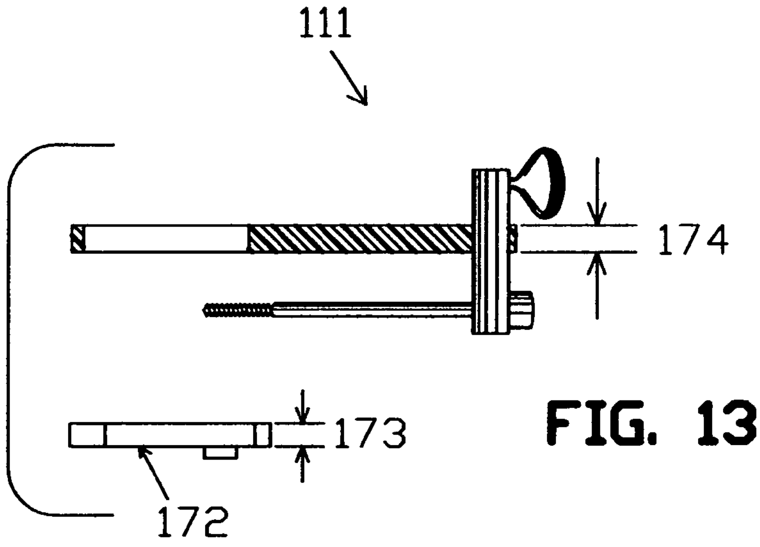
FIG. 13 is a cross-sectional view of a fourth slide and a side view of the spacer to be used with it.
Figure 14:
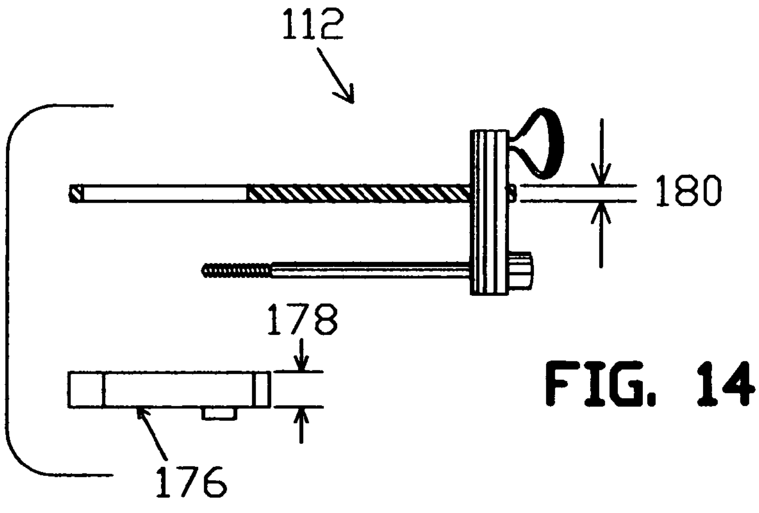
FIG. 14 is a cross-sectional view of a fifth slide and a side view of a spacer to be used with it.

Referring to FIG. 13, the fourth slide 111 is provided with a third spacer 172 having a configuration identical to the first spacer 144 except that the thickness 173 thereof is equal to the thickness of a stack of three chips 11. The slide 111 has a thickness 174 that is less than the thickness 134 of slide 108 by the thickness 173 of the third spacer 172 such that when the spacer 144 and fourth slide 111 are fitted into passage 81, the fourth slide 111 will eject two chips 11 with each inward movement, or actuation, thereof. Referring to FIG. 14, in like manner, the fifth slide 112 has a fourth spacer 176 associated therewith, and the fourth spacer 176 is also identical to the first spacer 144 but with a thickness 178 equal to the height of a stack of four chips. The associated slide 112 has a thickness 180 that is equal to the thickness 134 of the slide 108 less the thickness 178 of the fourth spacer 176. When the fifth slide 112 and the fourth spacer 176 are assembled into the last passage 82 the slide 112 will expel a single chip on each actuation.

Figure 15:
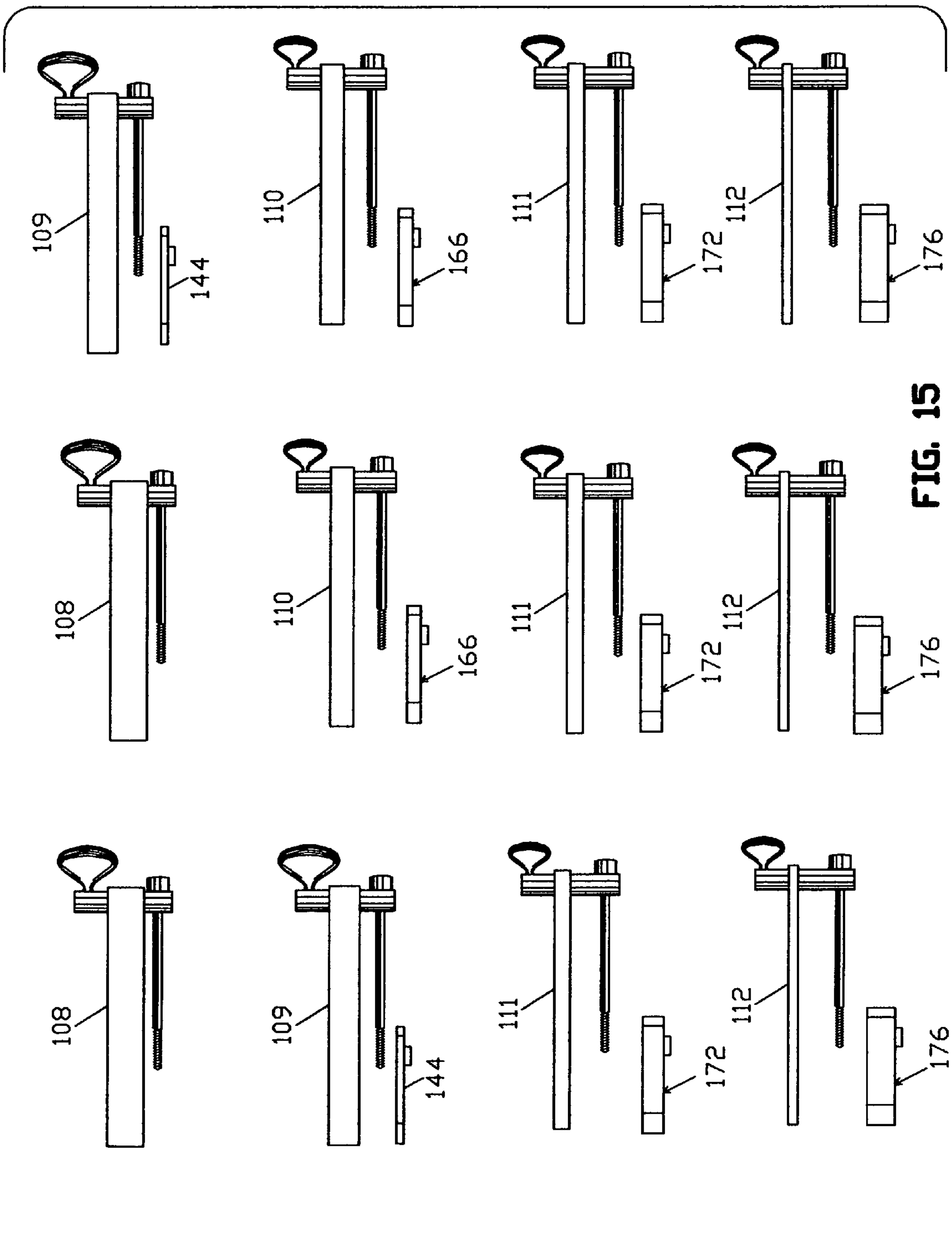
FIG. 15 shows an assortment of slides and spacers to be sold along with the dispensing device as a kit.

In the preferred embodiment, the dispenser 10 is not sold with the five slides 108-112 as described, but is sold as a kit that includes the dispensing structure 13 plus an assortment of slides and associated spacers in excess of the five described above. A typical assortment is shown in FIG. 15. In this case, the kit includes the dispensing structure 10, not shown in FIG. 15, and the assortment of slides and spacers depicted in FIG. 15. The kit includes two slides 108 capable of dispensing five chips with each actuation, two slides 109 and two associated spacers 144 for dispensing four chips upon each actuation, two slides 110 and two associated spacers 166, three slides 111 and their associated spacers 170, and three slides 112 with their associated spacers 176. It should be apparent that the kit may include any number of combinations of the slides 108-112 of various thicknesses as long as the number of slides of each thickness has an associated spacer provided therewith.

To change the number of chips 11 dispensed from a given dispensing passages 78-82, the retaining pin 130 retaining the existing slide therein is unthreaded from its associated threaded hole 140 after which the slide is removed from the passage 78-82. Before inserting a replacement slide having a thickness for dispensing a different number of chips 11, any spacer associated with the removed slide is removed from the passage and a spacer associated with the replacement slide is inserted therein. Thereafter, the replacement slide 108-112 is inserted into the passage 78-82 and the retaining pin 130 is inserted through the hole in the post 127 of the new slide and the threaded end thereof is re-threaded into the hole 140 in the base 14.

As can be seen, the dispenser 10 can be configured such that each slide 108-112 dispenses a different number of chips, or the dispensing slides can be configured to dispense an identical number of chips as the players of the game may desire. Like colored chips 11-11 are assembled into each of the tubes 22-26 such that the chips in each of the tubes 22-26 may represent a different money value. With the dispensing slides 108-112 adjusted to dispense the desired number of chips on each actuation, a banker can use the various slides to accurately dispense a stack of chips equal to the purchase price paid by a player.

Referring further to FIG. 1, it should be appreciated that all the chips 11 inserted into any one of the tubes 22-26 will be of the same denomination so that the slide for each tube will dispense chips having the same given value with each actuation. For example, if a slide dispenses five chips valued at $25.00 each with each actuation, it will dispense $125.00 worth of chips on each actuation. The value of the chips being dispensed can be indicated on a marker, three of which 181, 182, 183 are visible, attached to the wall of tubes 22-26, or to the slide to assist the banker in exchanging cash for chips.

Figure 16:
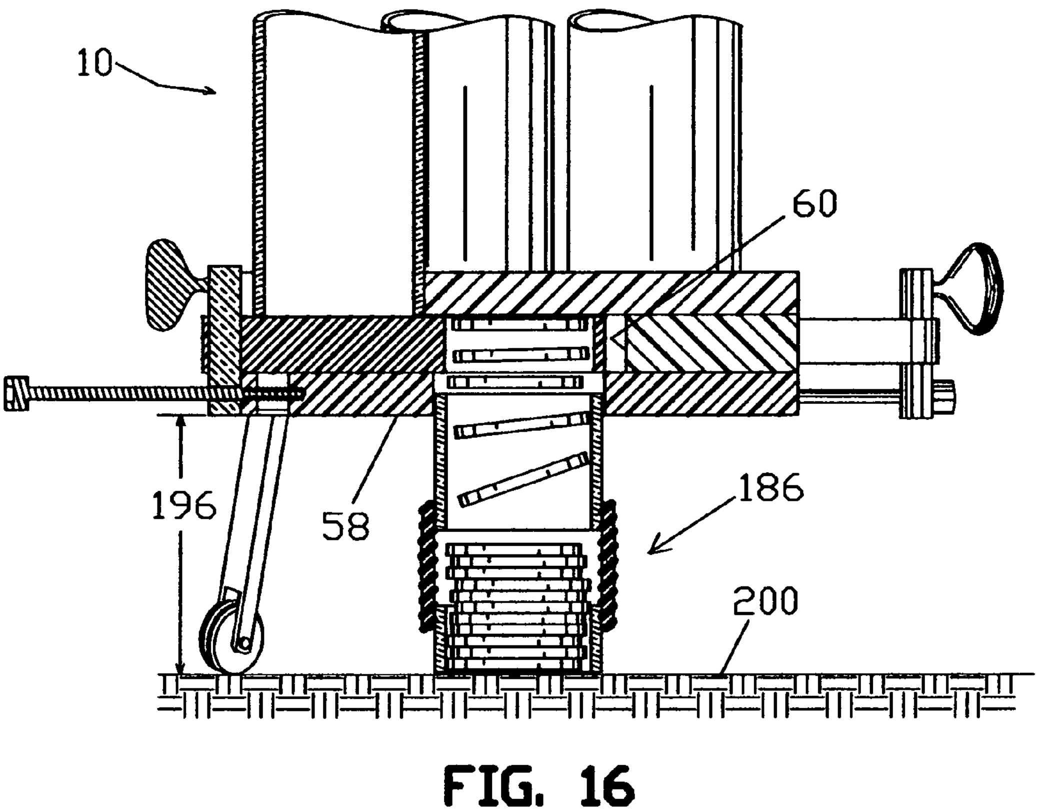
FIG. 16 is a fragmentary cross-sectional view of the dispenser shown in FIG. 1 with a retainer to receive the chips dispensed.
Figure 17:
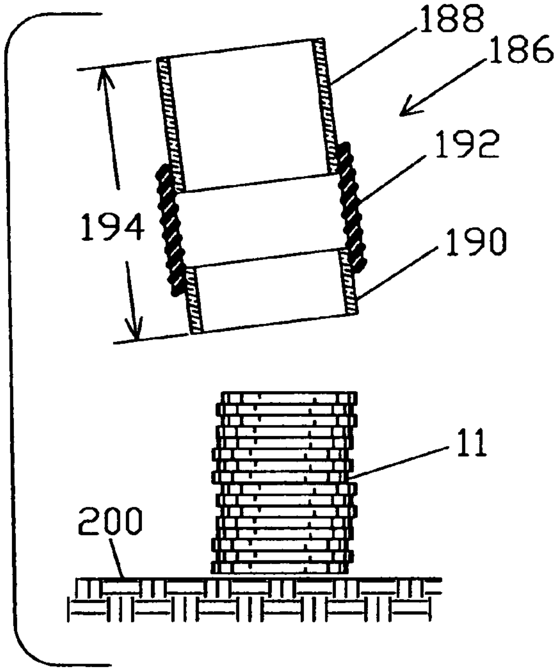
FIG. 17 is a cross-sectional view of the retainer shown in FIG. 16 being moved from a stack of chips.

Referring to FIGS. 16 and 17, in another aspect of the invention, a tubular retainer 186 is positioned below the dispensing hole 60 in the lower surface of the base 14. Preferably, the dispensing retainer 186 includes an upper and lower rigid tubular member 188, 190 made of a suitable material such as wood or plastic. The tubular members 188, 190 have inner diameters that are a little larger than the diameter 12 of the chips 11. Positioned between the upper and lower tubular members 188, 190 is a flexible tubular member 192 made of a resilient material such as rubber. The flexible member 192 also has an inner diameter that is at least as large as the diameter 12 of the chip 11. The height 194 of the retainer 186 which represents the overall axial length of the upper and lower tubular members 188, 190 plus the flexible member 190 is a little greater than the height 196 that the legs 16-16 and wheels 18-18 retain the lower surface 58 of the base 14 above the surface 200 of a table or the like upon which the dispenser 10 rests.

It is desirable that the hole 60 in the lower surface of the base 14 has a diameter large enough to slideably receive the upper end of the upper tubular member 188. Accordingly, the retainer 186 can be compressed by compressing the flexible tubular member 192 such that the overall height thereof is less than the height 196 of the lower surface 58 above the table surface 200. The retainer 186 can then be positioned below the hole 60 after which the retainer 186 is released allowing it to return to its full height 194 with the upper end thereof inserted in the hole 60 as shown in FIG. 17. When the various slides 108-112 are subsequently actuated to dispense chips 11-11 of the various colors and valuations, the chips 11 will fall into the retainer 186. Thereafter, a banker can again compress the flexible member 192 of the retainer 186 and move the retainer 186 out from underneath the base 14. The banker can then lift up the retainer 186 and leave the stack of chips on the table surface 200 as shown. The player who purchases the chips 11-11 will then receive an orderly stack of chips with like colored chips adjacent to each other. The player can therefore easily count the number of chips of each color to affirm that the value of the chips delivered is equal to the price he has paid.

Referring to FIG. 1, it may be desirable to provide a chip dispenser for which the tubes 22-26 that retain the chips 11 are removable from the dispensing structure 13. For example, it may be desirable to clean the interiors of the dispensing tubes 22-26, which cannot be readily done when the tubes are secured into the base 14. Also, carrying cases for retaining poker chips are often configured to retain chips in long rows and it may be easier to fill the tubes 22-26 with chips. Where the tubes 22-26 are removable from the dispensing structure 13, the removed tube can be positioned with the open positioned near one end of a row of chips and scooping the chips into the open end of the tube.

Figure 19:
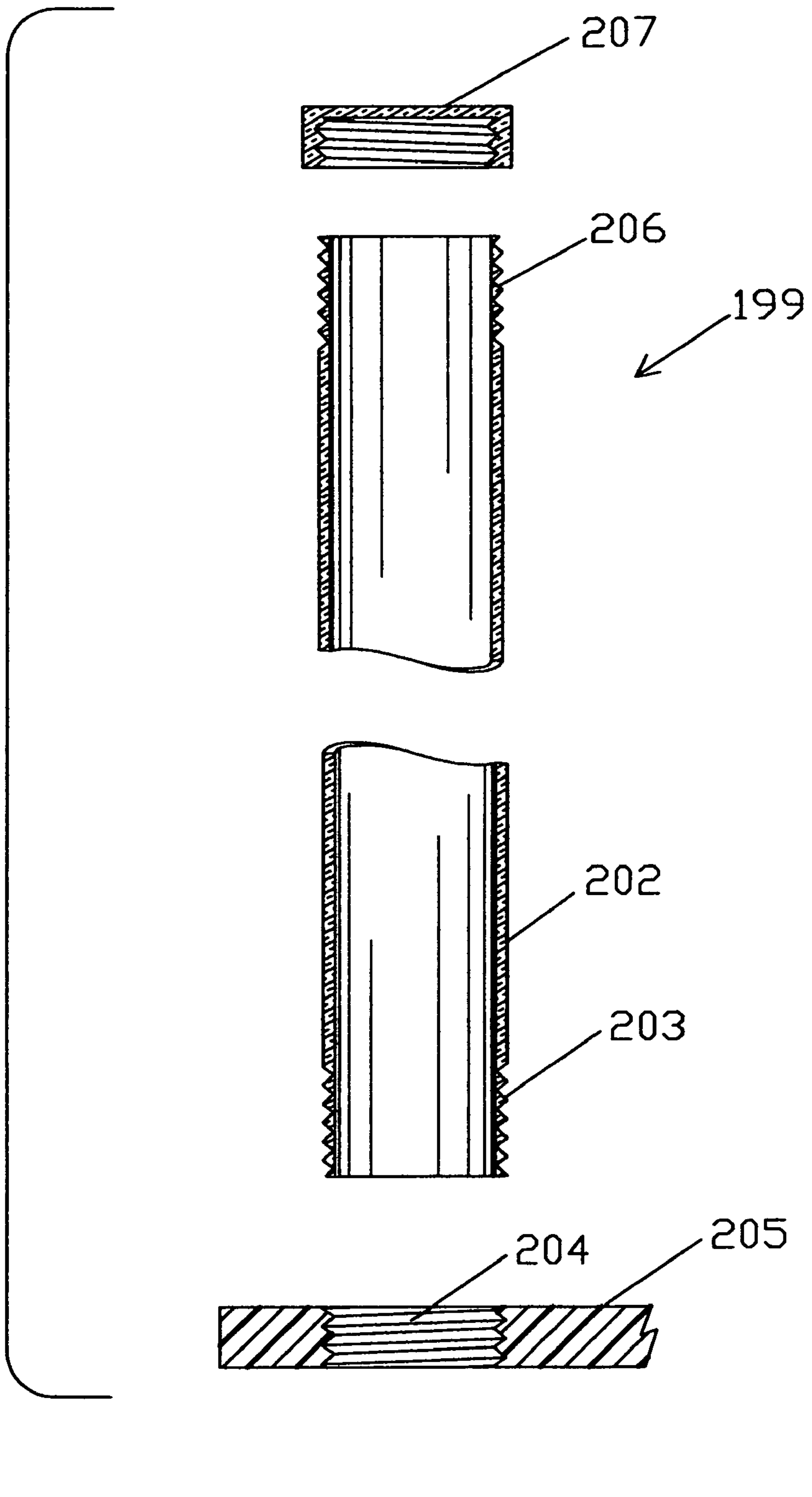
FIG. 19 is a fragmentary exploded cross-sectional view of a dispensing structure in accordance with a second embodiment of the invention.

Referring to FIG. 19 in which a fragmentary portion of a dispensing member 199 having a removable tube 202 is depicted. In this embodiment, the structure of the dispensing member 199 is identical to the dispensing member 13 described with respect to FIGS. 1 and 2, except for the configuration of the upper member 52, the tubes 22-26, and of the upper plate 28 and cover plate 40, all of which are depicted differently in FIG. 19 than their counterparts of the first embodiment. Specifically, instead of providing that the tubular members (bearing indicia numbers 22-26 in FIGS. 1 and 2) are retained in transverse holes in the upper member 52 as described with respect to the first embodiment, the tubular members of this embodiment (of which member 202 is representative of all) have threadings 203 at the lower end thereof and another threading 206 at the upper end thereof. The threadings 203 at the lower end of each tube 202 are threadedly engaged in a threaded hole 204 in the upper member 205 that forms a portion of the base 14 as depicted with respect to the first embodiment. The upper member 205 differs only from the upper member 52 previously described in that the apertures 86, 87, 88, 89, 90 in the upper member 205 are threaded, and threaded hole 204 in FIG. 19 is representative of all the apertures in upper member 205 that receive tubular members 22-26 for retaining chips. At the upper end of the dispensing member, the upper plate 28 and the cover plate 40 are replaced by a screw cap 207 at the upper end of each of the tubes 202.

With the tubes 202 assembled to a dispensing member as described above, the tubes 202 can be removed by unthreading the lower threaded portion 203 from the complementary threads 204 in the upper member 205 of the base of a dispensing member. The tube 202, with a cap 207 attached to the upper end thereof, can then be used to scoop up a row of chips retained in a chip holder. Alternately, the cap 207 can be removed from the upper end of the tube 202 to facilitate cleaning the interior of each tube 202.

While the present invention has been described with respect to two embodiments, it will be appreciated that many modifications and variations can be made without departing from the spirit and scope of the invention. It is therefore the intent of the appended claims to cover all such variations and modifications that fall within the spirit and scope of the invention.

What is claimed is:

1. A chip dispenser for dispensing a plurality of chips of a given thickness and outer diameter, said dispenser comprising a dispensing structure retaining a plurality of stacks of chips, each of said plurality of stacks having a longitudinal axis, all of said longitudinal axes being parallel to each other, said dispensing structure having a discharge hole from which all of said chips are discharged, a plurality of slides for use with said dispensing structure wherein each of said plurality of slides will move at least one chip of one of said stacks of chips to said discharge hole upon a movement of said slide, each of said plurality of slides moveable in a direction perpendicular to said axes, and a spacer for use with said first of said plurality of slides, said spacer to reduce the height of a dispensing passage in said dispensing structure.

2. The chip dispenser of claim 1 wherein said plurality of slides exceeds said plurality of stacks of chips in said dispensing structure.

3. A chip dispenser for dispensing a plurality of chips of a given thickness and outer diameter, said dispenser comprising a dispensing structure retaining a plurality of stacks of chips, each of said plurality of stacks having a longitudinal axis, all of said longitudinal axes being parallel to each other, said dispensing structure having a discharge hole from which all of said chips are discharged, a plurality of slides for use with said dispensing structure wherein each of said plurality of slides will move at least one chip of one of said stacks of chips to said discharge hole upon a movement of said slide, each of said plurality of slides moveable in a direction perpendicular to said axes, said slides receivable in a plurality of passages, one of said passages for each of said stacks of chips, and said slides replaceable in said passages wherein a first slide for dispensing a first number of chips is replaceable with a second slide for dispensing a second number of chips, and said first number of chips is not equal to said second number of chips.

4. The chip dispenser of claim 1 and further comprising a plurality of wheels on said dispensing structure, each of said wheels mounted on an axle, and said axles all defining radii of the same circle wherein said dispensing structure is rotatable on said plurality of wheels.

5. The chip dispenser of claim 1 and further comprising a tubular chip retainer having an inner diameter greater than said given outer diameter of said chips, and said tubular retainer being axially compressible.

6. The chip dispenser of claim 1 wherein said dispensing member further comprises a base, a plurality of tubes sized to receive chips, and said plurality of tubes removably received in said base wherein said tubes can be removed from said base for cleaning and filling with chips.

7. A chip dispenser for dispensing a plurality of chips of a given thickness and outer diameter, said dispenser comprising a dispensing structure for retaining a plurality of stacks of chips around a vertical axis, said dispensing structure having a centrally located discharge hole, a radially moveable slide for moving at least one chip of one of said plurality of stacks of chips to said discharge hole for discharging said at least one chip from said dispensing structure.

8. The chip dispenser of claim 7 and further comprising a plurality of wheels on said dispensing structure, each of said wheels mounted on an axle, and said axles all defining radii of the same circle wherein said dispensing structure is rotatable on said plurality of wheels.

9. The chip dispenser of claim 7 and further comprising a tubular chip retainer having an inner diameter greater than said given outer diameter of said chips, and said tubular retainer being axially compressible.

10. The chip dispenser of claim 7 wherein said dispensing member further comprises a base, a plurality of tubes sized to receive chips, and said plurality of tubes removably received in said base wherein said tubes can be removed from said base for cleaning and filling with chips.

11. A chip dispenser for dispensing a plurality of chips of a given thickness and outer diameter, said dispenser comprising a base having generally planar parallel horizontal upper and lower surfaces, an outer wall, and an inner cavity, said lower surface having a central opening in communication with said inner cavity, said central opening sized to allow a chip to pass therethrough, said outer wall having a plurality of apertures, said base having a plurality of passages therein with one passage extending radially from each of said apertures in said outer wall into said inner cavity, said upper surface having a plurality of apertures therein with each of said apertures in said upper surface communicating with one of said passages, a retainer above each of said apertures in said upper surface wherein each retainer will retain a stack of said chips aligned to fall through said upper surface and into said associated passage, a moveable slide fitted in each of said passages, each of said moveable slides having an inner end, an outer end, and a thickness, each said slide moveable between an outward position and an inward position, each said slide having a surface at said inner end for contacting at least one of said chips of said stack of chips extending into said associated passage wherein said surface will move said at least one of said chips to said central opening when said slide is moved to said inward position.

12. The chip dispenser of claim 11 wherein said chip dispenser is rotatable about a vertical axis.

13. The chip dispenser of claim 11 and further comprising a plurality of wheels below said base, each of said wheels mounted on an axle, and said axles all defining radii of the same circle wherein said chip dispenser is rotatable on said plurality of wheels.

14. The chip dispenser of claim 11 and further comprising a tubular chip retainer having an inner diameter greater than said given outer diameter of said chips, and said tubular retainer being axially compressible.

15. The chip dispenser of claim 9 wherein all of said passages have a given height, and at least one of said slides has a first thickness and at least one of said slide has a second thickness where said second thickness is less than said first thickness.

16. The chip dispenser of claim 15 and further comprising a spacer for insertion into one of said passages for reducing a height thereof to less than said given height wherein said passage with said spacer will receive said slide with said second thickness and said slide with said second thickness will dispense fewer chips than will be dispensed by said slide with said first thickness.

17. The chip dispenser of claim 16 wherein the number of said slides exceeds the number of said plurality of apertures in said upper surface.

18. The chip dispenser of claim 11 wherein said dispensing member further comprises a base, a plurality of tubes sized to receive chips, and said plurality of tubes removably received in said base wherein said tubes can be removed from said base for cleaning and filling with chips.

* * * * *